(12) United States Patent
Breneur

(10) Patent No.: US 7,100,350 B2
(45) Date of Patent: Sep. 5, 2006

(54) HAYING MACHINE

(75) Inventor: David Breneur, Saverne (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 10/508,944

(22) PCT Filed: Apr. 11, 2003

(86) PCT No.: PCT/FR03/01156

§ 371 (c)(1),
(2), (4) Date: Oct. 1, 2004

(87) PCT Pub. No.: WO03/086045

PCT Pub. Date: Oct. 23, 2003

(65) Prior Publication Data

US 2005/0172603 A1    Aug. 11, 2005

(30) Foreign Application Priority Data

Apr. 16, 2002 (FR) .................................. 02 04834

(51) Int. Cl.
*A01D 76/00* (2006.01)
*A01D 78/00* (2006.01)
*A01D 80/00* (2006.01)
*A01D 84/00* (2006.01)

(52) U.S. Cl. .................. 56/365; 172/481; 172/683; 403/322.3

(58) Field of Classification Search ........... 172/776, 172/311, 466, 481, 683, 662; 56/385, 365, 56/228; 403/322.3, 322.1
See application file for complete search history.

(56) References Cited

U.S. PATENT DOCUMENTS

| 3,814,191 A | * | 6/1974 | Tilbury .................. 172/311 |
| 3,955,627 A | * | 5/1976 | Brown .................. 172/130 |
| 4,316,511 A | * | 2/1982 | Andersen ................ 172/776 |
| 4,615,397 A | * | 10/1986 | Hastings ................ 172/776 |
| 4,660,654 A | * | 4/1987 | Wiebe et al. ............ 172/776 |
| 4,867,245 A | * | 9/1989 | Stevens ................ 172/311 |
| 5,274,990 A | | 1/1994 | Aron et al. |
| 5,653,489 A | * | 8/1997 | Fandrich et al. ........ 294/110.1 |
| 5,839,516 A | * | 11/1998 | Arnold et al. .......... 172/456 |
| 2002/0005629 A1 | * | 1/2002 | Rosenboom .............. 280/651 |

FOREIGN PATENT DOCUMENTS

| DE | 199 33 799 | 2/2001 |
| EP | 0 316 560 | 5/1989 |
| EP | 0 701 771 | 3/1996 |
| EP | 0 784 920 | 7/1997 |
| FR | 2 525 854 | 11/1983 |
| GB | 1 034 911 | 7/1966 |

* cited by examiner

*Primary Examiner*—Árpád Fábián Kovács
(74) *Attorney, Agent, or Firm*—Oblon, Spivak, McClelland, Maier & Neustadt, P.C.

(57) ABSTRACT

A haymaking machine including a frame carrying at least one pair of rotors connected to carrying arms that may be moved from a working position, in which they are substantially horizontal, to a transport position, in which they are substantially vertical, and vice-versa. The carrying arms of at least one pair of rotors include a latching mechanism that connects them together and locks them with regard to one another in the transport position.

16 Claims, 4 Drawing Sheets

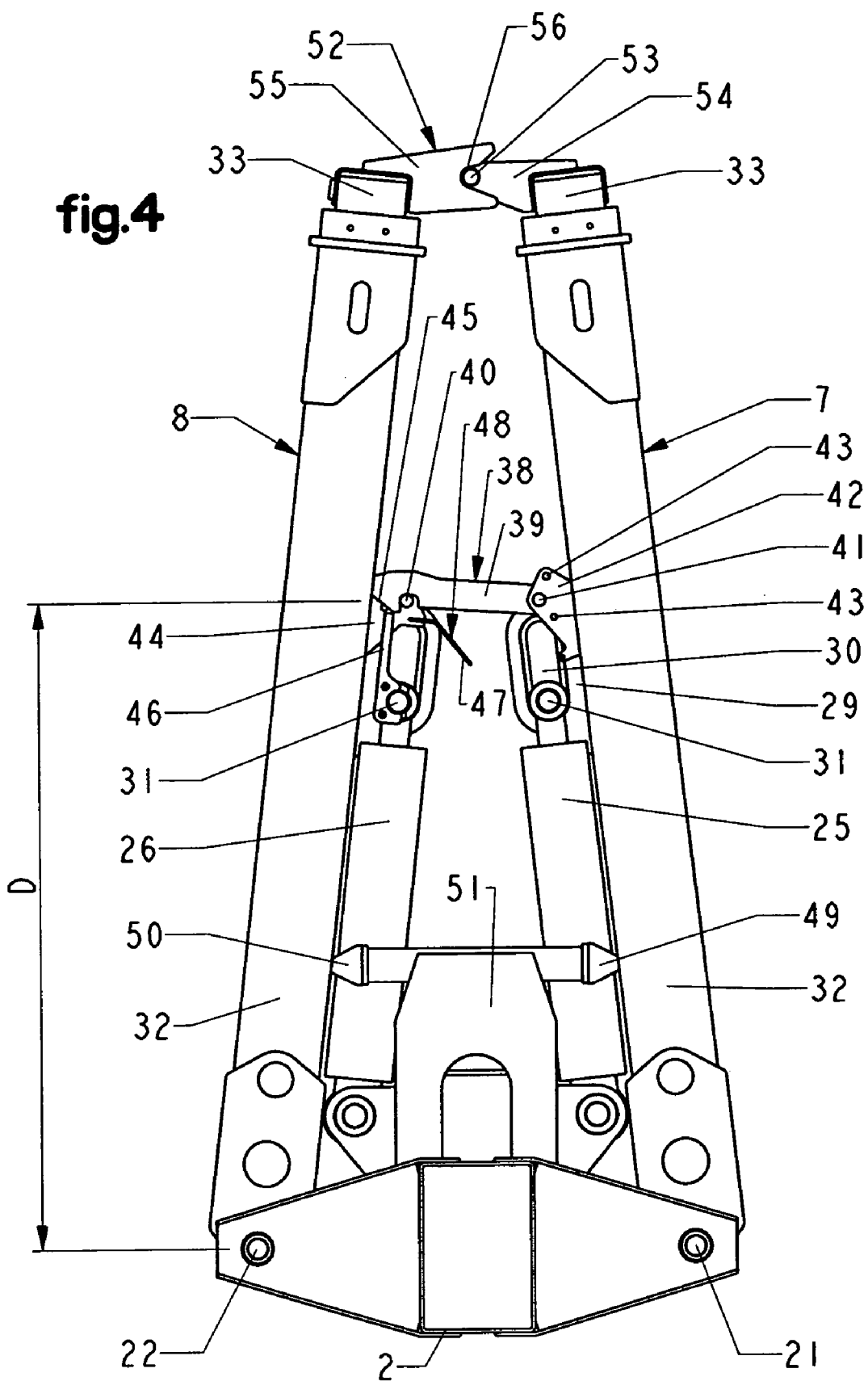

HAYING MACHINE

BACKGROUND OF THE INVENTION

1. Field of the Invention

The present invention relates to a haymaking machine, particularly for windrowing forage, comprising a frame carrying at least one pair of windrowing rotors that can be driven in rotation about substantially vertical supporting axes, which rotors are connected to carrying arms which are situated substantially in one and the same plane perpendicular to the direction of travel, the one on the right and the other on the left of the frame and which are articulated on said frame by means of axes of articulation about which they can be moved from a working position, in which they are substantially horizontal, to a transport position, in which they are substantially vertical, and vice-versa, by means of hydraulic jacks.

Placing the carrying arms and the rotors in a substantially vertical position makes it possible to considerably reduce the width of the machine. This allows it to be easily moved on public roads. In this position, it is however necessary to immobilize said arms in order to prevent them accidentally returning to the working position.

2. Background Art

On a known machine, the carrying arms are immobilized in transport position by means of latches which are situated on the frame and which are hooked onto said arms close to their axes of articulation on said frame. These latches then connect the carrying arms to the frame. When the machine travels over unevennesses, they are subject to intense stresses due to the forces exerted on them by the carrying arms with considerable lever arms. These latches therefore have to be particularly strong, which makes them bulky and difficult to maneuver. In addition, they suffer heavy wear which can rapidly compromise safety during travel.

SUMMARY OF THE INVENTION

The object of the present invention is to propose a machine as described in the introduction which does not have the aforementioned drawbacks.

Accordingly, an important feature of the invention consists in that the carrying arms of each pair of rotors comprise latching means which connect them together and lock them with regard to one another in transport position.

This disposition of the latching means on the carrying arms allows them to be distant from the frame and the axes of articulation of said arms on the frame. They may for example be situated at a distance from said axes which is at least equal to half the length of the carrying arms when they are in transport position. The stresses that are exerted on the latching means are then considerably reduced. The hold of these latching means and the safety are thus improved. In addition, these means can be simple and less costly.

According to another feature of the invention, the frame comprises abutments which stop the carrying arms when they reach transport position and which are distant from the latching means. The position of the carrying arms for transport is thus defined in a very precise manner relative to the frame.

According to another feature of the invention, the carrying arms comprise immobilizing means that are distant from latching means. As a result, these immobilizing means practically prevent the carrying arms from moving relative to one another in transport position. Thus a nearly rigid connection is obtained between the frame and the carrying arms during transport.

BRIEF DESCRIPTION OF THE DRAWINGS

Other features and advantages of the invention will emerge from the claims and from the following description of a nonlimiting exemplary embodiment of the invention, with references to the appended drawings in which:

FIG. 4 represents a view similar to that in FIG. 3 with the pair of carrying arms in a transport position.

DESCRIPTION OF THE PREFERRED EMBODIMENT

Figure 1:
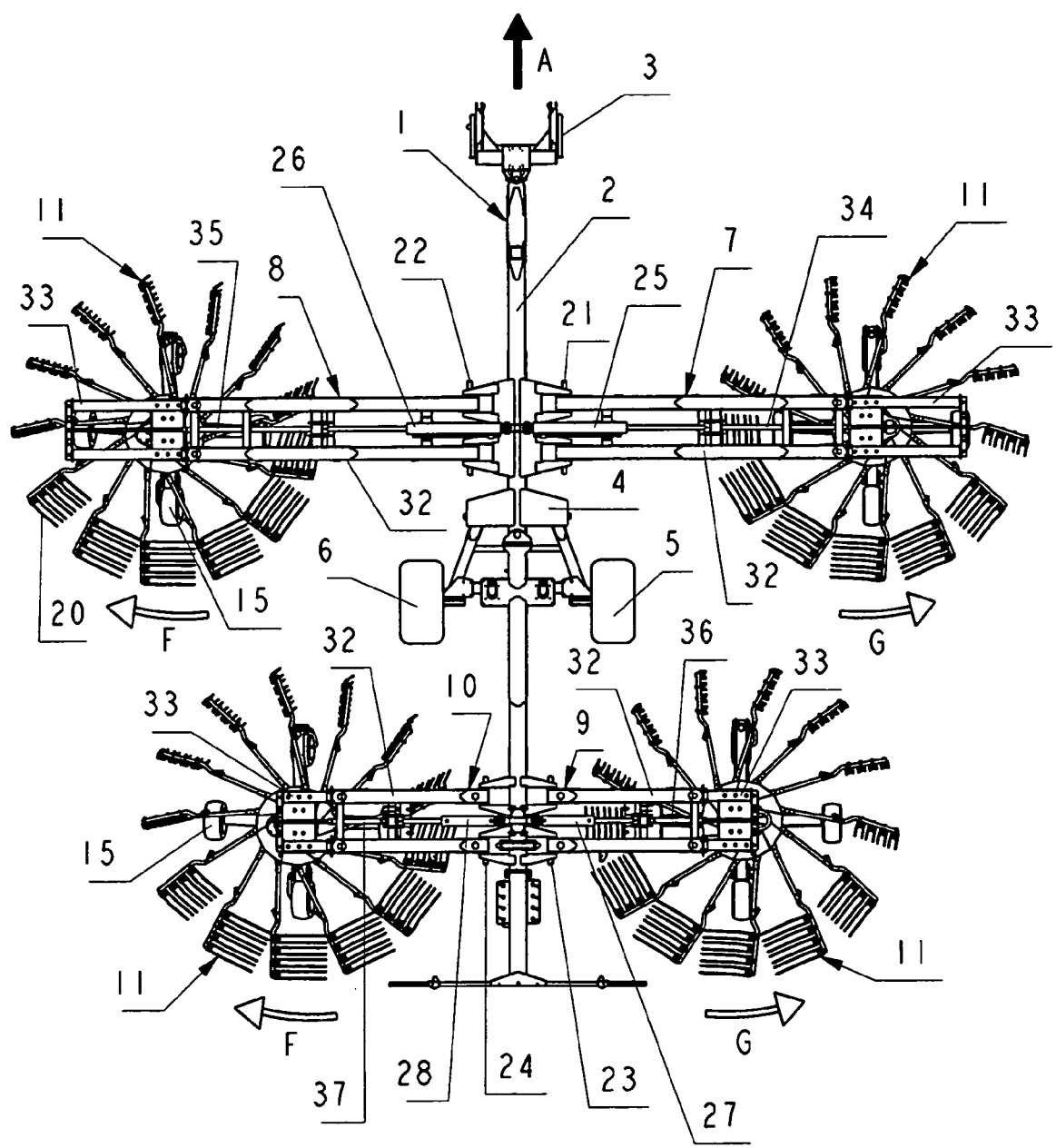
FIG. 1 represents a top view of a machine according to the invention in working position.
Figure 2:
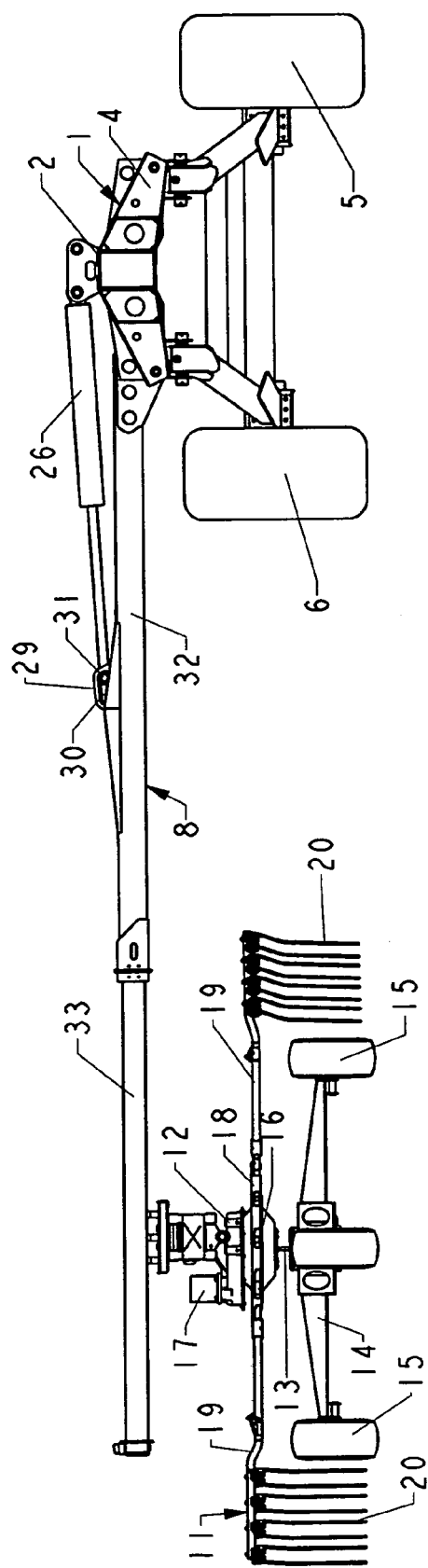
FIG. 2 represents a simplified view of one carrying arm of a rotor.

As is represented in figures 1 and 2, the machine according to the invention comprises a frame (1). This consists of a central beam (2) which has at its front end a coupling device (3) for attaching it to a driving tractor and, at the rear of said device (3), a support (4) with two traveling wheels (5 and 6) which rest on the ground. The frame (1) also comprises four arms (7, 8, 9 and 10) each carrying one rotor (11) intended to windrow products such as mown grass or straw spread on the ground. These arms (7 to 10) are disposed in pairs, one of which is situated forward of the central beam (2) and the other rearward of the latter. The two carrying arms (7 and 8, 9 and 10) of each pair are situated substantially in one and the same plane perpendicular to the direction of travel (A), one on the right and the other on the left of the beam (2). The number of pairs of rotors (11) and pairs of carrying arms (7 to 10) may vary according to the working width of the machine.

Each rotor (11) has a housing (12) which is connected to the corresponding carrying arm (7 to 10). In this housing (12) is lodged a substantially vertical support axis (13). This axis (13) extends downward and carries at its lower end a support (14) with several branches fitted with carrying wheels (15) situated beneath the rotor (11). On the portion of the axis (13) which lies between the housing (12) and the support (14) is placed a casing (16). This is mounted on said axis (13) such that it can be driven in rotation. The upper side of the casing (16) is fitted with a crown wheel which is situated in the volume defined by the housing (12). This crown wheel meshes with a drive gear which is also situated in the housing (12). Said gear is secured to a shaft which may be connected to a hydraulic motor (17) providing the rotary drive. Said shaft may also be connected, via transmission shafts, to a power take-off shaft of the tractor.

The casing (16) is fitted with bearings (18) through which arms (19) pass. The latter extend in the form of spokes and carry at their outer ends windrowing tools (20) consisting of forks. They are housed in said bearings (18) in such a way as to be able to rotate on themselves. On the portion of the axis (13) that is located inside of the casing (16) is mounted a fixed cam intended to control the tool carrier arms (19) during the windrowing work. For this, each of these arms (19) has at its end which extends inward into the casing (16) a lever with a roller which is guided in a known manner in a groove of the cam.

The carrying arms (7 to 10) consist of two interconnected parallel beams. They are articulated on the central beam (2) by means of substantially horizontal axes of articulation (21 to 24) directed in the direction of travel (A). Each carrying arm (7 to 10) is associated with a hydraulic jack (25 to 28) which is used to move it about its axis of articulation (21 to 24) from a working position, in which it is substantially horizontal, to a transport position, in which it is substantially vertical, and vice-versa. These hydraulic jacks (25 to 28) are articulated on the beam (2) and on the carrying arms (7 to 10). Accordingly, these carrying arms (7 to 10) comprise plates (29) furnished with oblong holes (30) in which are engaged shafts (31) that are secured to the rods of said hydraulic jacks (25 to 28) (see FIGS. 2 to 4). The latter may be connected to the hydraulic system of the tractor and be controlled from the latter.

The carrying arms (7 to 10) of the rotors (11) are made in two telescopic portions (32 and 33). The first portion (32) of each arm (7 to 10) is connected to the corresponding axis of articulation (21 to 24) on the central beam (2) while the second portion (33) carries the corresponding rotor (11).

Each second portion (33) can slide relative to the first portion (32) in order to vary the position of the corresponding rotor (11) relative to the beam (2) between an inner position in which it lies close to the beam (2) and an outer position in which it is distant from the beam (2).

Each carrying arm (7 to 10) comprises a hydraulic jack (34 to 37) of which one end is connected to the first portion (32) and the other end to the second portion (33). These jacks (34 to 37) may thus perform the abovementioned movements of the second portions (33) of the carrying arms (7 to 10). These jacks (34 to 37) may also be connected to the hydraulic system of the tractor and be controlled from the latter.

Figure 3:
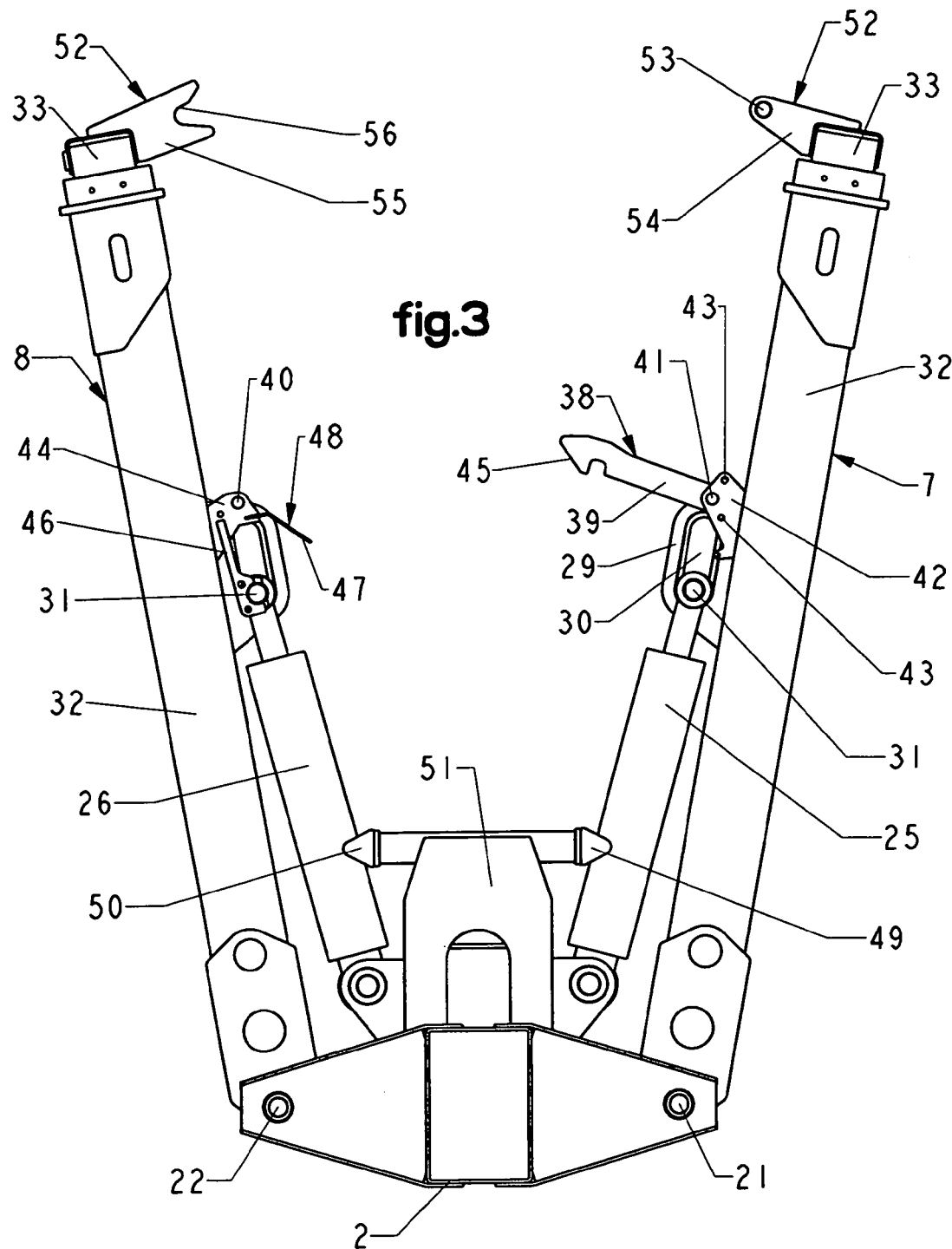
FIG. 3 represents a detailed view of a pair of carrying arms while being placed in transport position.

As is shown in FIGS. 3 and 4, the carrying arms (7 and 8) of the pair of rotors (11) situated foremost comprise latching means (38) which connect them together and lock them to one another in the transport position. The carrying arms (9 and 10) of the pair of rotors (11) situated hindmost may comprise substantially identical latching means.

Said latching means (38) consist of a latch (39) which is articulated on the carrying arm (7) and a stop (40) arranged on the other carrying arm (8). The latch (39) is articulated by means of an axis (41) which is directed in the direction of travel (A) and which may be attached to lugs (42) secured to the first portion (32) of the carrying arm (7). The lugs (42) have abutments (43) situated on either side of the latch (39) to limit its movements and keep it in a position from which it may hook onto the stop (40). The stop (40) consists of an axis attached by means of lugs (44) onto the first portion (32) of the carrying arm (8). The latch (39) has one end in the form of a hook that can hook onto the stop (40) and whose front portion forms a ramp (45) that can slide onto said stop (40).

These latching means (38) are distant from the beam (2) of the frame (1). They are situated on the carrying arms (7 and 8) at a distance (D) from their axes of articulation (21 and 22) on the frame (1) which is equal to or greater than half the length of said carrying arms (7, 8) in transport position (see FIG. 4). The stresses exerted on these means (38) by the carrying arms (7 and 8) are thus less important.

According to one particularly advantageous embodiment, said latching means (38) are situated in the vicinity of the ends of the hydraulic jacks (25 and 26) that are connected to the carrying arms (7 and 8). The rod of the jack (26) which is close to the stop (40) may then comprise an actuating finger (46). The latter is directed toward the latch (39) in transport position. They automatically push the latter in order to disengage it from the stop (40) when the jacks (25 and 26) are controlled to lower the carrying arms (7 and 8) to working position. The lugs (44) comprise a piece (47) forming a ramp (48) to retain and guide the latch (39).

The frame (1) also comprises abutments (49 and 50) which are distant from the latching means (38) and which stop the carrying arms (7 and 8) when they reach the transport position. These abutments (49 and 50) are secured to supports (51) which are attached to the beam (2) of the frame (1). They are situated between the latching means (38) and the axes of articulation (21 and 22) when the carrying arms (7 and 8) are in transport position. Preferably, they are closer to said axes of articulation (21 and 22) than to the latching means (38). Their ends against which the carrying arms (7 and 8) rest are advantageously elastic. The latter may for example be made of plastic.

The machine may also comprise means (52) of immobilizing the carrying arms (7 and 8) in transport position. These immobilizing means (52) are distant from the latching means (38) and from the abutments (49 and 50). They are situated for example at the upper ends of the carrying arms (7 and 8) in transport position. Said immobilizing means (52) consist of a stop (53) which is connected to a support (54) secured to the carrying arm (7) and of a lug (55) with a V-shaped notch (56) which is secured to the other carrying arm (8). Said stop (53) may have the shape of a cylindrical axis. The latter is situated in the bottom of the notch (56) when the carrying arms (7 and 8) are in transport position.

The carrying arms (9 and 10) of the pair of rotors (11) which is situated hindmost may comprise abutments and immobilizing means substantially identical to those described above.

During work, the machine is moved in the direction of travel (A). The carrying arms (7 to 10) are lowered to a substantially horizontal position by means of the hydraulic jacks (25 to 28) and the wheels (15) of the rotors (11) move over the ground. The latter may follow the unevennesses of the ground thanks to the oblong holes (30) which allow the carrying arms (7 to 10) to move heightwise relative to the hydraulic jacks (25 to 28). Said rotors (11) are disposed in such a way as to form a V (see FIG. 1) and they are driven in rotation such that they rotate in the direction of the arrows F and G. The tools (20) of the foremost two rotors (11) are controlled by their respective cams such that they pick up the forage on the front halves of their trajectories, move it toward the beam (2) and deposit it in the form of windrows. The tools (20) of the hindmost two rotors (11) are controlled similarly. They pick up all the forage that lies in their trajectories, including that which is deposited by the two preceding rotors (11) and assemble it to form a large volume central windrow. The width of work obtained with the rotors (11) may be modified with the aid of the telescopic carrying arms (7 to 10) particularly according to the density of the forage and the handling capacity of the baler or of the forage harvester which is used to pick up the windrow.

For transport, the carrying arms (7 to 10) are retracted to the maximum by means of the hydraulic jacks (34 to 37) and are raised about the axes (21 to 24) to a substantially vertical position in order to reduce the overall dimension. Such lifting is performed with the aid of the hydraulic jacks (25 to 28) which are controlled so that they retract. Initially, their axes (31) slide in the oblong holes (30) until they rest against the sidewalls forming the ends of the latter. Then, they exert a tractive force on the carrying arms (7 to 10) which pivot upward about the axes of articulation (21 to 24) on the beam (2). When they come close to the transport position represented in FIG. 4, the end (45) of the latch (39) slides onto the ramp (48) and then onto the stop (40). Then, said latch (39) automatically hooks onto the stop (40) under the effect of its own weight and connects the two arms (7 and 8) together such that they can no longer move backwards again.

Simultaneously the carrying arms (7 and 8) encounter the abutments (49 and 50) which define their transport position. The elastic ends of these abutments (49 and 50) are then slightly compressed.

Finally, the stop (53) of the immobilizing means (52) at the same time enters the notch (56) and is lodged in the bottom of the latter. Said stop (53) thus locks the carrying arms (7 and 8) with respect to one another and nearly prevents any pivoting on the axes of articulation (21 and 22) when the machine passes over an unevenness.

If the carrying arms (9 and 10) of the hindmost two rotors (11) are fitted with the same latching means (38), the same abutments (49 and 50) and the same immobilizing means (52), they are immobilized in transport position in the same manner as has just been described.

For placing in working position, the latch (39) is disengaged from the stop (40) in order to release the carrying arms (7 and 8) of the rotors (11). Accordingly, the hydraulic jacks (25 and 26) are controlled in order that they extend. The actuating finger (46) which is connected to the rod of the hydraulic jack (26) then pushes automatically the latch (39) away and holds it at a distance from the stop (40). Said carrying arms (7 and 8) then pivot outward as the hydraulic jacks (25 and 26) lengthen. The stop (53) of the immobilizing means (52) automatically comes out of the notch (56). As soon as the rotors (11) approach or touch the ground, the lengthening of the carrying arms (7 and 8) can be adjusted according to the required working width.

The carrying arms (9 and 10) of the rear rotors (11) may be moved in the same manner from their transport position to the working position.

It is obvious that the invention is not restricted to the embodiments described above and represented in the appended drawings. Modifications remain possible, particularly with regard to the constitution or the number of the various elements or by substituting equivalent techniques, without however departing from the field of protection.

The invention claimed is:

1. A haymaking machine comprising:
a frame carrying at least one pair of windrowing rotors configured to be driven in rotation about substantially vertical supporting axes,
first and second carrying arms situated in a plane perpendicular to a direction of travel and which have the rotors mounted thereto, the first carrying arm being connected to a first side of said frame and the second carrying arm being connected on a second side of the frame opposite the first side,
said first and second carrying arms being articulated on the frame by axes of articulation about which the first and second carrying arms are movable from a working position, in which the first and second carrying arms are substantially horizontal, to a transport position, in which the first and second carrying arms are substantially vertical, and vice-versa, by hydraulic jacks,
wherein at least one of the first and second carrying arms comprise a latching mechanism configured to connect the first carrying arm to the second carrying arm and to lock the first and second carrying arms to one another in the transport position.

2. A machine as claimed in claim 1, wherein the latching mechanism includes a latch articulated on one of the carrying arms and a stop placed on the other carrying arm.

3. A machine as claimed in claim 2, further comprising means for guiding the latch such that the latch can automatically hook onto the stop.

4. A machine as claimed in claim 2, wherein the latching mechanism is distant from a beam of the frame.

5. A machine as claimed in claim 4, wherein the latching mechanism is situated on the carrying arms at a distance from their axes of articulation on the frame which is at least equal to half a length of the carrying arms in the transport position.

6. A machine as claimed in claim 5, wherein the latching mechanism is situated on the carrying arms in a vicinity of ends of the hydraulic jacks that are connected to the carrying arms.

7. A machine as claimed in claim 6, wherein the latch is configured to be released automatically from the stop by the hydraulic jack moving the carrying arm which is fitted with the stop.

8. A machine as claimed in claim 7, wherein the hydraulic jack comprises an actuating finger.

9. A machine as claimed in claim 1, wherein the frame comprises abutments distant from the latching mechanism configured to stop the carrying arms when the carrying arms reach the transport position.

10. A machine as claimed in claim 9, wherein the abutments are situated between the axes of articulation of the carrying arms and the latching mechanism, when the carrying arms are in the transport position.

11. A machine as claimed in claim 9, wherein the abutments comprise elastic ends.

12. A machine as claimed in claim 1, further comprising means for immobilizing the carrying arms in the transport position, which means for immobilizing are distant from the latching mechanisms.

13. A machine as claimed in claim 12, wherein the means for immobilizing is situated at upper ends of the carrying arms in the transport position.

14. A machine as claimed in claim 13, wherein the means for immobilizing includes a stop secured to one of the carrying arms of each pair of rotors and a lug with a V-shaped notch secured to the other carrying arm of each pair of rotors.

15. A machine as claimed in claim 14, wherein the stop is situated in a bottom portion of the notch when the carrying arms are in the transport position.

16. A haymaking machine, comprising:
a frame carrying at least one pair of windrowing rotors configured to be driven in rotation about substantially vertical supporting axes, first and second carrying arms situated substantially in a plane perpendicular to a direction of travel, the first carrying arm being connected to a first side of said frame and the second carrying arm being connected to a second side of said frame opposite the first side, said first and second carrying arms being articulated on the frame by axes of articulation about which the first and second carrying arms can be moved from a working position, in which the first and second carrying arms are substantially horizontal, to a transport position, in which the first and second carrying arms are substantially vertical, and vice-versa, by hydraulic jacks,
wherein the at least one of the first and second carrying arms rotors comprise a latching mechanism configured to lock the first and second carrying arms in the transport position, the latching mechanism comprising a latch releasable automatically by one of the hydraulic jacks moving the first and second carrying arms from the working position to the transport position and vice-versa.

* * * * *

UNITED STATES PATENT AND TRADEMARK OFFICE
CERTIFICATE OF CORRECTION

| | | |
|---|---|---|
| PATENT NO. | : 7,100,350 B2 | Page 1 of 1 |
| APPLICATION NO. | : 10/508944 | |
| DATED | : September 5, 2006 | |
| INVENTOR(S) | : David Breneur | |

It is certified that error appears in the above-identified patent and that said Letters Patent is hereby corrected as shown below:

Column 6, line 58, delete "rotors"

Signed and Sealed this

Thirteenth Day of February, 2007

JON W. DUDAS
*Director of the United States Patent and Trademark Office*